US009260288B2

(12) United States Patent
Beuschel et al.

(10) Patent No.: US 9,260,288 B2
(45) Date of Patent: Feb. 16, 2016

(54) METHOD AND DEVICE FOR FILLING AND EMPTYING A SEAT CUSHION (71) Applicant: CONTI TEMIC MICROELECTRONIC GMBH, Nürnberg (DE)

(72) Inventors: Michael Beuschel, Stammham (DE); Martin Ebel, Ingolstadt (DE); Stefan Bauer, Engelbrechtsmünster (DE); Mehmet Cini, Kipfenberg (DE)

(73) Assignee: Conti Temic Microelectronic GmbH (DE)

( * ) Notice: Subject to any disclaimer, the term of this patent is extended or adjusted under 35 U.S.C. 154(b) by 0 days.

(21) Appl. No.: 14/385,314

(22) PCT Filed: Jun. 5, 2013

(86) PCT No.: PCT/EP2013/061589
§ 371 (c)(1),
(2) Date: Sep. 15, 2014

(87) PCT Pub. No.: WO2013/182600
PCT Pub. Date: Dec. 12, 2013

(65) Prior Publication Data
US 2015/0033522 A1 Feb. 5, 2015

(30) Foreign Application Priority Data
Jun. 5, 2012 (DE) .......................... 10 2012 209 449

(51) Int. Cl.
*F17D 1/16* (2006.01)
*B68G 7/06* (2006.01)
(Continued)

(52) U.S. Cl.
CPC ... *B68G 7/06* (2013.01); *A47C 4/54* (2013.01); *B60N 2/448* (2013.01); *B60N 2/4415* (2013.01); *Y10T 137/0396* (2015.04)

(58) Field of Classification Search
CPC ............ Y10T 137/0396; Y10T 137/36; Y10T 137/86002; Y10T 137/8667; Y10T 137/86574
USPC .............................................................. 5/710
See application file for complete search history.

(56) References Cited

U.S. PATENT DOCUMENTS 5,022,385 A 6/1991 Harza
5,640,731 A * 6/1997 Toedter .............................. 5/713
(Continued)

FOREIGN PATENT DOCUMENTS

DE 69029585 7/1997
DE 10333204 2/2005
(Continued)

OTHER PUBLICATIONS

International Search Report for PCT/EP2013/061589 mailed Aug. 26, 2013.
(Continued)

*Primary Examiner* — R. K. Arundale
(74) *Attorney, Agent, or Firm* — RatnerPrestia (57) ABSTRACT

The invention relates to a method and to a corresponding device for filling at least one seat cushion of a seat with, and emptying same of, a fluid, in which, during a filling or emptying operation, depending on a switching state of an actuating member designed for filling or emptying the at least one seat cushion, a first pressure value determined upstream of a throttle point through which the fluid flows, and a second pressure value determined downstream of the throttle point, are detected, and, depending on the first pressure value and the second pressure value, an estimated value of a mass of fluid supplied to or removed from the at least one seat cushion is determined.

15 Claims, 3 Drawing Sheets

(51) Int. Cl.
  *A47C 4/54* (2006.01)
  *B60N 2/44* (2006.01)

(56) References Cited

U.S. PATENT DOCUMENTS

| | | | |
|---|---|---|---|
| 6,012,474 A * | 1/2000 | Takamoto et al. | 137/14 |
| 6,398,303 B1 | 6/2002 | Herrmann | |
| 7,992,446 B2 | 8/2011 | Ebel | |
| 2002/0193911 A1 * | 12/2002 | Horiuchi et al. | 700/282 |
| 2005/0151410 A1 | 7/2005 | Sprouse | |
| 2006/0080781 A1 * | 4/2006 | Zheng | 5/681 |
| 2007/0000559 A1 | 1/2007 | Ebel | |
| 2008/0005843 A1 * | 1/2008 | Lokhorst et al. | 5/655.3 |
| 2011/0113560 A1 * | 5/2011 | Receveur | 5/706 |

FOREIGN PATENT DOCUMENTS

| | | |
|---|---|---|
| DE | 102005016974 | 10/2006 |
| EP | 0991342 | 4/2000 |
| EP | 1669006 | 12/2005 |
| EP | 1712405 | 10/2006 |
| WO | 9106274 | 5/1991 |
| WO | 2005009781 | 2/2005 |

OTHER PUBLICATIONS

Written Opinion of the International Searching Authority for International Application No. PCT/EP2013/061589.

* cited by examiner

$$\dot{m} = A \psi p_{in} C_d * \sqrt{\frac{2}{RT}} \quad (1)$$

$$\psi = \begin{cases} \sqrt{\frac{k}{k-1}} * \sqrt{1 - \left(\frac{p_{out}}{p_{in}}\right)^{\frac{k-1}{k}}} * \left(\frac{p_{out}}{p_{in}}\right)^{\frac{1}{k}} & (2) \\ \sqrt{\frac{k}{k+1}} * \left(\frac{2}{k+1}\right)^{\frac{1}{k-1}} = \psi_{max} & (3) \end{cases}$$

$$(2) \quad \text{if} \quad \frac{p_{out}}{p_{in}} > \left(\frac{2}{k+1}\right)^{\frac{k}{k-1}}$$

$$(3) \quad \text{if} \quad \frac{p_{out}}{p_{in}} \leq \left(\frac{2}{k+1}\right)^{\frac{k}{k-1}}$$

$$(4) \quad m = \int \dot{m} \, dt$$

METHOD AND DEVICE FOR FILLING AND EMPTYING A SEAT CUSHION

CROSS REFERENCE TO RELATED APPLICATIONS

This application is the U.S. National Phase Application of PCT/EP2013/061589, filed Jun. 5, 2013, which claims priority to German Patent Application No. 10 2012 209 449.0, filed Jun. 5, 2012, the contents of such applications being incorporated by reference herein.

FIELD OF THE INVENTION

The invention relates to a method and a device for filling a seat cushion of a seat with a fluid, and emptying same of a fluid.

BACKGROUND OF THE INVENTION

DE 103 33 204 A1, which is incorporated by reference, discloses a method for measuring the pressure of a container which can be filled with a medium. During filling or emptying, a corrected internal pressure is determined on the basis of a pressure value detected by means of a pressure sensor, as a function of a switched state of a valve which is provided for filling or emptying the container.

EP 0 991 342 B1, which is incorporated by reference, discloses a seat, having a seat cushion and a device which comprises at least one actuating element and has the purpose of generating a tilting movement of the pelvis of a sitting person about a longitudinal central axis and/or a transverse axis of the seat cushion.

DE 690 29 585 T2, which is incorporated by reference, discloses an ergonomic anti-fatigue device for moving the hips and the lower central part of a person who is sitting in a seat arrangement.

DE 10 2005 016 974 A1, which is incorporated by reference, discloses a seat, in particular a vehicle seat, having a seat frame, a seat cushion and shape-changing elements between the seat frame and the seat cushion. A rigid support plate is arranged between the shape-changing elements and the seat cushion. In the event of different changes in the shape-changing elements, the seat plate tips in different directions relative to the seat frame.

SUMMARY OF THE INVENTION

An aspect of the invention is a method and a corresponding device for filling a seat cushion of a seat with a fluid, and emptying same of a fluid, which method and device permit a simple and cost-effective design of a seat which is equipped with a seat cushion when filling the seat cushion in a satisfactorily reproducible way.

The invention is distinguished by a method and a corresponding device for filling at least one seat cushion of a seat with a fluid, and emptying same of a fluid. During a filling or emptying operation, a first pressure value which is determined upstream of a throttle point through which the fluid flows and a second pressure value which is determined downstream of the throttle point are detected as a function of a switched state of an actuating element which is designed for filling or emptying the at least one seat cushion, and an estimated value of a mass of the fluid which is fed to or removed from the at least one seat cushion is determined as a function of the first pressure value and the second pressure value.

This has the advantage that any desired intermediate positions of the filling of the seat cushion with fluid between a completely filled seat cushion and an emptied seat cushion can be achieved.

This permits a small number of seat cushions per seat to be implemented. As a result, the expenditure on the necessary electronics and the number of pneumatic and hydraulic components can be kept small. This keeps the installation space for the corresponding components small.

In one advantageous refinement, the actuating element and the throttle point are identical or form one structural unit. This has the advantage that the installation space for the pneumatic and hydraulic components can be kept small.

In a further advantageous refinement, the fluid is gaseous. This has the advantage that a pneumatic system which is easy to handle can be used for filling and emptying the seat cushion.

In a further advantageous refinement, the fluid is a liquid. This has the advantage that a hydraulic system which is easy to handle can be used for filling and emptying the seat cushion.

In a further advantageous refinement, the estimated value of a mass of the fluid which is fed to or removed from the at least one seat cushion is determined as a function of a quotient of the second pressure value with respect to the first pressure value.

In a further advantageous refinement, when the seat cushion is filled, the first pressure value is a value of a pressure at the fluid outlet of a fluid supply unit, and the second pressure value is a value of the pressure within the at least one seat cushion. This has the advantage that in this way the mass of the fluid which is fed to the at least one seat cushion can be determined easily.

In a further advantageous refinement, the value of the pressure at the fluid outlet of the fluid supply unit is determined by means of a characteristic curve of the fluid supply unit, as a function of an electrical characteristic variable of the fluid supply unit. This has the advantage that by means of the electrical characteristic variable of the fluid supply unit it is possible to determine the estimated value of the mass of the fluid which is fed to the at least one seat cushion.

In a further advantageous refinement, when the at least one seat cushion is emptied, the first pressure value is a value of the pressure within the at least one seat cushion, and the second pressure value is a value of the ambient pressure. This has the advantage that in this way the mass of the fluid which is removed from the at least one seat cushion can be determined easily.

In a further advantageous refinement, a setpoint value of the mass of the fluid which is to be fed to or removed from the at least one seat cushion is predefined, and the actuating element which is designed for filling or emptying the at least one seat cushion is opened as a function of the setpoint value of the mass of the fluid which is to be fed to or removed from the seat cushion and the estimated value of the mass of the fluid which is fed to or removed from the at least one seat cushion. This has the advantage that the actuating element which is designed for filling or emptying the at least one seat cushion can be opened until the estimated value of the mass of the fluid which is fed to or removed from the at least one seat cushion is equal to the setpoint value of the mass of the fluid which is to be fed to or removed from the seat cushion. As a result, very precise filling or emptying of the seat cushion can be achieved.

In a further advantageous refinement, ultimate emptying or maximum filling of the at least one seat cushion occurs as a function of a maximum pressure value or a minimum pressure value or a threshold value for a time profile of the pressure within the at least one seat cushion or a maximum activation time of the actuating element being reached.

In a further advantageous refinement, a maximum value of the mass of the fluid which is to be fed to or removed from the at least one seat cushion is predefined, and the actuating element which is designed for filling or emptying the at least one seat cushion is opened as a function of the maximum value of the mass of the fluid which is to be fed to or removed from the at least one seat cushion and the estimated value of the mass of the fluid which is fed to or removed from the at least one seat cushion. This has the advantage that the actuating element which is designed for filling or emptying the at least one seat cushion can be open until the at least one seat cushion is filled or emptied to a maximum extent.

In a further advantageous refinement, parameters which are used to determine the estimated value of the mass of the fluid which is fed to or removed from the at least one seat cushion are adapted as a function of the difference between the estimated value and the maximum value of the mass of the fluid which is to be fed to or removed from the at least one seat cushion. This has the advantage that a high level of accuracy can be achieved during the determination of the estimated value of the mass of the fluid which is fed to or removed from the at least one seat cushion. As a result, changes, in particular at the throttle point or changed operating conditions, for example of the pressure or of the temperature of the fluid, can be taken into account.

In a further advantageous refinement, the seat has at least two seat cushions and a pneumatic or hydraulic valve is arranged pneumatically or hydraulically between two of the seat cushions, and the valve is actuated in such a way that at least partial fluid equalization takes place between the two seat cushions. This has the advantage that volume equalization can take place between the two seat cushions.

As a result, there can be a saving, in particular, in energy for the fluid supply unit. Furthermore, a long service life of the fluid supply unit can be achieved.

According to a further aspect of the invention a device for filling at least one seat cushion with a fluid and emptying same of a fluid is provided, in particular for carrying out the method described above. In this context, advantageous refinements of the method can, insofar as they can be applied to the device, also be considered as advantageous refinements of the device.

BRIEF DESCRIPTION OF THE DRAWINGS

Exemplary embodiments of the invention are explained below with reference to the schematic drawings, in which.

Elements with the same design or function are provided with the same reference symbols in all the figures.

DETAILED DESCRIPTION OF THE INVENTION

Figure 1:
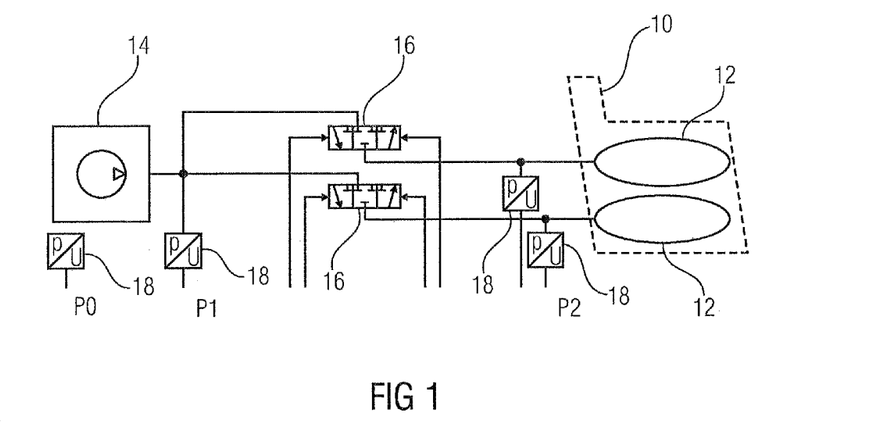
FIG. 1 shows a schematic view of part of a device for filling and emptying a seat cushion.

FIG. 1 shows a device with a seat 10. The seat 10 is preferably designed for arrangement in a vehicle. The seat 10 has at least one seat cushion 12. By means of such a seat cushion 12 the seat 10 can be individually adapted to the vehicle occupant and a high level of comfort, in particular on long journeys of the vehicle, can be achieved. Furthermore, by means of the seat cushions 12 it is possible to implement massage functions, apart from in the region of the seat surface, in particular in the region of the backrest of the seat 10.

The seat 10 preferably has two seat cushions 12. The seat 10 can also have merely a single seat cushion 12 or more than two seat cushions 12. The seat 10 preferably has an even number of seat cushions 12. The seat cushions 12 are preferably arranged on the right-hand side or left-hand side of the seat 10 so they can generate a movement of parts of the seat 10 about an axis which is located in the longitudinal center plane of the seat 10. In the text which follows, the seat 10 is assumed to have two seat cushions 12.

The seat cushions 12 can be filled with a fluid by means of a fluid supply unit 14, or the seat cushions 12 can be emptied of the fluid. The fluid is, in particular, gaseous, preferably air. In the case of a pneumatic system, the fluid supply unit 14 is preferably a compressor. In further preferred embodiments, the fluid can also be a liquid. In the case of a hydraulic system, the fluid supply unit 14 is, in particular, a pump.

In order to be able to fill or empty the seat cushion 12, the device has actuating elements 16. The actuating elements 16 are preferably valves. During filling of the seat cushion 12, the seat cushion is hydraulically or pneumatically connected to the fluid supply unit 14. In particular air can be fed to the seat cushion 12 via the actuating element 16 by means of a fluid supply unit 14 which is embodied as a compressor. If the pressure in the seat cushion 12 is to be lowered, in particular a pneumatic connection from the seat cushion 12 to the surroundings is formed via the actuating element 16 so that fluid can be discharged directly to the surroundings from the seat cushion 12.

The device for filling and emptying the seat cushion 12 also has pressure sensors 18. In particular, an ambient pressure p0 of the surroundings into which the fluid is discharged from the seat cushion 12 is measured. Furthermore, a value p1 of a pressure at the fluid outlet of the fluid supply unit 14 and a value p2 of a pressure which is representative of the pressure inside the at least one seat cushion 12 are measured. In a further embodiment, the value p1 of the pressure at the fluid outlet of the fluid supply unit 14 can be determined in directly by evaluating a known characteristic curve of the fluid supply unit 14. In particular, the value p1 of the pressure at the fluid outlet of the fluid supply unit 14 is determined by a current or voltage characteristic curve of the fluid supply unit 14. It is therefore possible to dispense with a sensor for directly measuring the pressure at the fluid outlet of the fluid supply unit 14.

Figure 2:
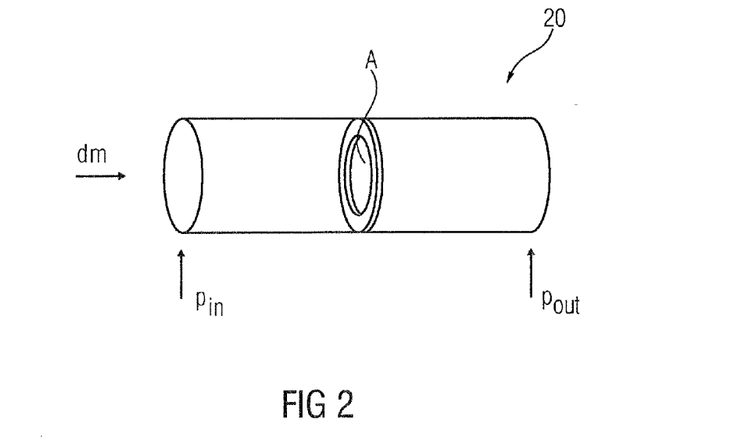
FIG. 2 shows a schematic view of a throttle point.

FIG. 2 shows a throttle point 20 through which the fluid flows. With respect to FIG. 1, actuating elements 16 and throttle points are preferably identical in each case. Alternatively, the corresponding actuating element 16 forms with the throttle point 20 one structural unit in each case. A first pressure value $p_{in}$ is detected upstream of the throttle point 20. Furthermore, a second pressure value $p_{out}$ is detected downstream of the throttle point 20. A mass flow dm/dt through the throttle point 20 results with a cross-sectional area A and a nozzle coefficient $C_D$ of the throttle point 20, the gas constant R, the isotropic coefficient K and a temperature T of the fluid according to the formulas (1) to (3) of FIG. 3 using the parameter $\Psi$.

Figure 3:
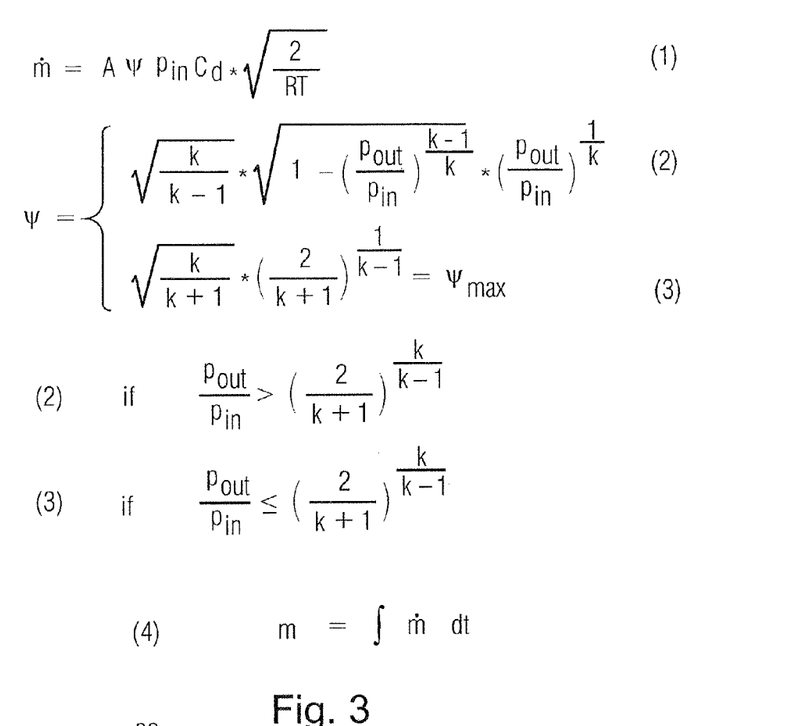
FIG. 3 shows a formula for calculating the fluid mass which is respectively fed into or removed from the seat cushion.

The fluid mass m which is respectively fed into the seat cushion 12 or removed therefrom is determined according to formula (4) in FIG. 3 by integrating or summing the mass flow dm/dt. Each filling operation or emptying operation starts here with the value m=0. If an operation is composed of a plurality of partial operations, the value m of the fluid mass between said partial operations is not reset to the value zero.

The filling or emptying of the seat cushion 12 occurs preferably in a plurality of steps. In this context, intermediate steps for partially filling or emptying the seat cushion 12 and final steps for completely filling or emptying the seat cushion 12 are differentiated. During the execution of intermediate steps, a setpoint value m_SP of the fluid mass which is to be fed into the at least one seat cushion 12 or removed therefrom is predefined. The actuating element 16 which is designed for filling or emptying the at least one seat cushion 12 is opened as a function of the setpoint value m_SP of the mass of the fluid which is to be fed into the seat cushion or removed therefrom and an estimated value m_EST of the mass of the fluid which is fed into the at least one seat cushion 12 or removed therefrom. The estimated value m_EST of the mass of the fluid which is fed into the seat cushion 12 or removed therefrom is preferably determined as in accordance with formula (2) or FIG. 3 by means of a quotient of the second pressure value $p_{out}$ with respect to the first pressure value $p_{in}$. In alternative embodiments, the estimated value m_EST of the mass of the fluid which is fed into the seat cushion 12 or removed therefrom can also be determined as a function of the difference between the second pressure value $p_{out}$ and the first pressure value $p_{in}$. In alternative embodiments, a technical closed-loop control observer, for example a Kalman filter, can also be used to determine the estimated value m_EST of the mass of the fluid which is fed into the seat cushion 12 or removed therefrom.

If ultimate emptying or maximum filling of the seat cushion 12 is to be carried out, this can advantageously be defined by an independent condition such as, for example, the reaching of an upper or lower final pressure, a threshold value for a pressure gradient dp/dt or a time limit of the filling or emptying operation. In further embodiments, various combinations of these conditions for reaching the maximum or minimum fluid mass in the seat cushions 12 can also be used.

In a further refinement, a plurality of partial steps (filling or emptying) can also follow one another alternately and in any desired sequence without resetting the integration. In this context, the integrated estimated values m_EST for the filling is steps and the emptying steps are offset against one another. In this way, for example a specific filling level can be repeated and approached without an intermediate final step.

Figure 4:
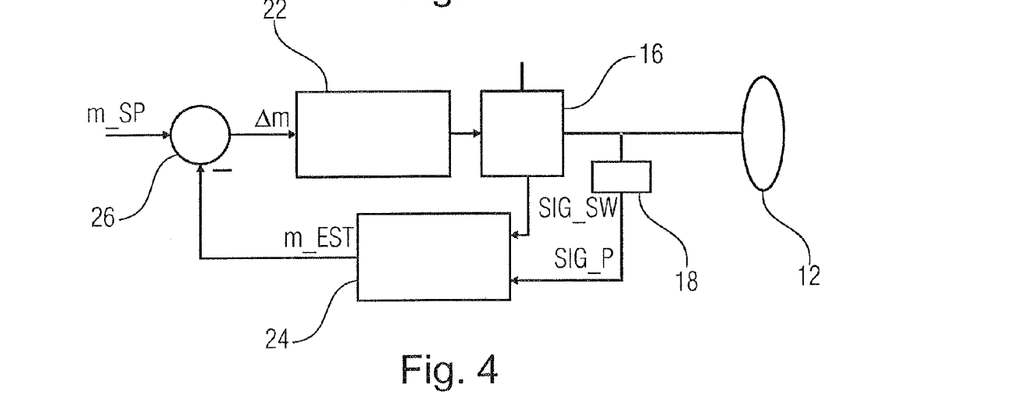
FIG. 4 shows a flowchart relating to the method for filling and emptying a seat cushion.

As is apparent from the simplified diagram relating to the sequencing of the filling or emptying of the seat cushion 12 in FIG. 4, a closed-loop control unit 22 acts on the actuating element 16. The closed-loop control unit 22 permits the seat cushion 12 to be filled or emptied by means of the actuating element 16. A measurement signal SIG_P of the pressure sensor 18 is fed, together with a switching signal SIG_SW of the actuating element 16 to a measuring element 24. The measuring element 24 determines the estimated value m_EST of the mass of the fluid which is fed to the at least one seat cushion or removed therefrom. The estimated value m_EST of the mass of the fluid which is fed to the at least one seat cushion 12 or removed therefrom is compared with the setpoint value m_SP of the mass of the fluid which is to be fed to the seat cushion or removed therefrom, at a comparison point 26, and a resulting difference value Δm of the mass of the fluid is fed to the closed-loop control unit 22. The closed-loop control unit 22 is preferably embodied as a three-point controller. In alternative embodiments, the closed-loop control unit 22 is embodied as a threshold value circuit or as a multi-stage or infinitely variable closed-loop controller.

Figure 5:
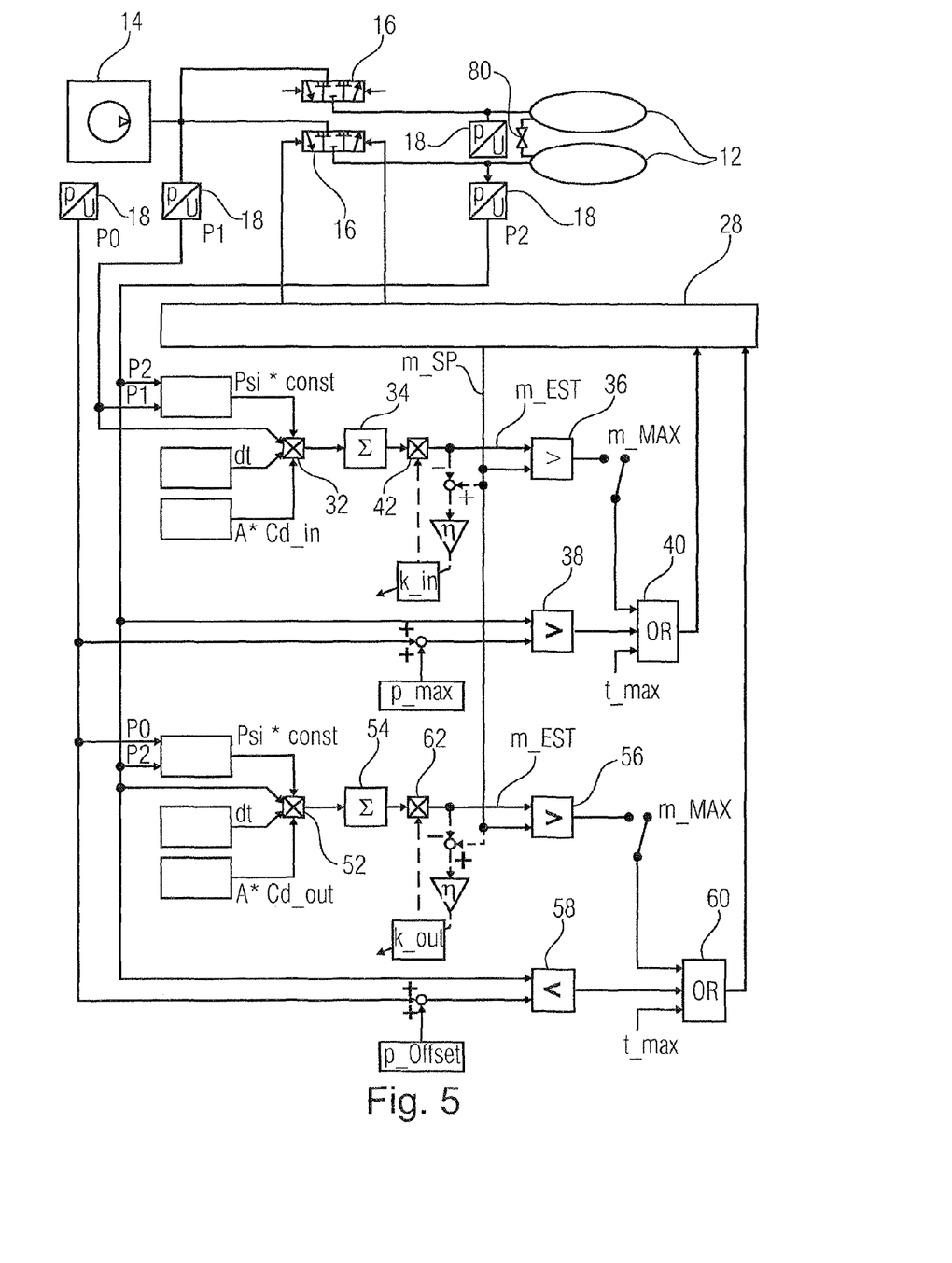
FIG. 5 shows a detailed flowchart of the method for filling and emptying a seat cushion.

FIG. 5 shows a detailed diagram of the sequence of the filling or emptying of the seat cushions 12 with simple implementation for one of the seat cushions 12 on one side of the seat 10. The second seat cushion 12 is embodied in an analogous fashion thereto and is only indicated here. In further embodiments, more than two seat cushions 12 can also be used.

The filling or emptying of the at least one seat cushion 12 is realized by actuating the actuating element 16 and the fluid supply unit 14 by means of a valve controller 28. The setpoint value m_SP of the fluid mass for a partial filling is predefined by the valve controller 28. Different parameters for the model of the throttle point 20 are preferably used for the filling and emptying of the at least one seat cushion 12. In particular, a nozzle coefficient Cd_in is preferably used for the filling, and a nozzle coefficient Cd_out for the emptying of the at least one seat cushion 12.

For the filling of the at least one seat cushion 12, the mass flow dm/dt of the fluid is calculated with the pressure values p1, p2 and the parameters corresponding to the formulas in FIG. 3 (inter alia the sampling time dt, the nozzle coefficient Cd_in of the throttle point 20) by means of a multiplier element 32. The mass flow dm/dt of the fluid is summed by means of a summing element 34 to form the estimated value m_EST. At a comparison element 36 it is checked whether the estimated value m_EST reaches the setpoint value m_SP of the fluid mass for a partial filling of the seat cushion 12. For the complete filling of the seat cushion 12, a maximum value m_MAX of the mass of the fluid which is to be fed to the seat cushion 12 is predefined. The actuating element 16 which is designed for filling the seat cushion 12 is opened until the estimated value m_EST of the mass of the fluid which is removed from the seat cushion 12 reaches the maximum value m_MAX. Furthermore, during the partial or complete filling of the seat cushion 12, it is checked in a further comparison element 38 whether in each case a maximum pressure p_MAX is reached in the seat cushion 12. In an OR element 40 it is checked whether at least one of the two last-mentioned conditions is met or in each case a maximum activation time t_max is reached. If one of these conditions is met, the filling of the seat cushion 12 is ended by the valve controller (FIG. 5). By means of this procedure it is advantageously possible to reach a defined maximum filling state and therefore to avoid integrating a possible estimation error for the estimated value m_EST.

As is illustrated by dashed lines, a correction value k_in can additionally be determined using a weighting factor η_in, which can be between 0 and 1. With the correction value k_in it is possible to carry out adaptation of the estimated value m_EST by means of a further multiplier element 42. In this way it is possible to obtain a very precise estimated value m_EST for the fluid mass which is fed to the seat cushion 12.

For the emptying of the seat cushion 12, the mass flow dm/dt is calculated with the pressure values p0, p2 and the parameters corresponding to the formulas in FIG. 3 (inter alia the sampling time dt, the nozzle coefficient Cd_out of the throttle 20) by means of a further multiplier element 52. The mass flow dm/dt is summed by means of a further summing element 54 to form the estimated value m_EST. At a further comparison element 56 it is checked whether partial emptying of the seat cushion 12 is achieved. For the complete emptying of the seat cushion 12, a maximum value m_MAX of the mass of the fluid which is to be removed from the seat cushion 12 is predefined. The actuating element 16 which is designed for emptying the seat cushion 12 is opened until the estimated value m_EST of the mass of the fluid which is removed from the seat cushion 12 reaches the maximum value m_MAX. Furthermore, during the partial or complete emptying of the seat cushion 12, it is checked in a further comparison element 58 whether in each case a minimum pressure p_Offset is reached in the seat cushion 12. In a further OR element 60 it is checked whether at least one of the two last-mentioned conditions is met or in each case the maximum activation time t_max is reached, and the emptying of the seat cushion 12 is ended by the valve controller 28 (FIG. 5). By means of this procedure it is advantageously possible to reach a defined empty state and therefore to avoid integration of a possible estimation error for the estimated value m_EST.

As is illustrated by dashed lines, a correction value k_out can additionally be determined using a weighting factor η_out, which can be between 0 and 1, by means of which correction value k_out the estimated value m_EST can be adapted by means of a further multiplier element 62. It is possible in this way to obtain an estimated value m_EST which is as accurate as possible for the fluid mass which is discharged from the seat cushion 12.

Since the weighting factors η_in, η_out are between 0 and 1, overshooting during the adaptation of the estimated value m_EST can be avoided and an influence of faults can be filtered out.

The target values for the partial filling or emptying are advantageously predefined in a parameterizable fashion. For example, a middle position between two seat cushions 12 can therefore be set very precisely. In this context it is possible, in particular, to take into account the fact that the relationship between the fluid mass in the seat cushion 12 and the geometry of the cushion can be non-linear and that filling and emptying operations can take place in a different direction and at different pressure levels.

After a final step, the parameters of the computational model can be additionally and advantageously adapted by comparing the determined estimated value m_EST of the mass of the fluid which is fed to or removed from the seat cushion 12 with the expected maximum value m_MAX of the mass of the fluid which is fed to or removed from the seat cushion 12. The objective of such adaptation is to approximate the two values to one another in the course of one or more cycles for future filling and emptying operations. This increases the accuracy of the future computational steps.

Adaptation can take place both by means of the rule of three and by means of a learning algorithm such as is known from adaptive systems (for example interference variable observers, neural networks). The target value of the fluid mass can advantageously be predefined for the individual steps as a function of earlier operations and of ambient conditions.

In particular, the consideration of earlier operations and of the model parameters determined on the basis thereof can be used to adapt the system to a disruption of the component parameters, to the change therein of the service life and to operating conditions (such as, for example, the temperature or the air pressure) which are changed in other ways.

For this purpose, model parameters can be stored in a non-volatile fashion during operation and called again at the next filling or emptying operation.

In addition to the fluid mass, changes in the geometry of the seat cushion 12 are dependent on further variables such as, for example, the ambient pressure p0 and the temperature T of the fluid. Starting values of the target value are advantageously also determined as a function of these parameters. The deviation at the first cycle after the switching on is therefore minimized and the scope of the necessary adaptation kept small.

In addition to the embodiment presented here with two seat cushions 12, an embodiment with four seat cushions 12, which permits subdivision into four zones, can in particular also be realized. In addition to filling or emptying a right-hand or left-hand seat cushion 12, filling and emptying of front or rear seat cushions is therefore also possible.

In a further particularly preferred embodiment, a valve 80 which is embodied as an overflow valve is arranged between two seat cushions 12 (see FIG. 5). The valve 80 is opened for a predefined time in order to reach the central position of filling of the seat cushions 12, so that as a result of the weight of the vehicle occupant a volume equalization can take place between the two seat cushions 12. Alternatively, such a connection can also be produced by suitable actuation of the actuating elements 16. One advantage of the valve 80 is, in particular, that in this way pressure equalization between two seat cushions 12 can take place passively and switching over to active filling or emptying of the seat cushions 12 can occur again only when a plurality of loads have to be supplied simultaneously at the fluid supply unit 14. Such an embodiment has the advantage that there can be a saving in energy for the production of pressure and a long service life of the fluid supply unit 14 can be achieved.

In addition to the embodiment presented, in the case of a liquid-based system it is also possible to use an estimated value of the fluid mass for a hydraulic resistance or a hydraulic throttle point.

The presented filling or emptying of the at least one seat cushion 12 of the seat 10 has the advantage that, in particular, precise approaching of intermediate positions of the filling between two end positions can be achieved. It is therefore possible to achieve positions beyond a fixed middle position of the filling of the two seat cushions 12. Furthermore, even when a plurality of seat cushions 12 are supplied via a single fluid supply unit 14 it is possible to achieve precise filling of the plurality of seat cushions 12.

LIST OF REFERENCE SYMBOLS

10 Seat
12 Seat cushion
14 Fluid supply unit
16 Actuating element
18 Pressure sensor
20 Throttle point
22 Closed-loop control unit
24 Measuring element
26 Comparison point
28 Valve controller
32 Multiplier element
34 Summing element
36 Comparison element
38 Further comparison element
40 OR element
42 Further multiplier element
52 Further multiplier element
54 Further summing element
56 Further comparison element
58 Further comparison element
60 Further OR element
62 Further multiplier element
80 Valve
$p_{in}$ Pressure value
$p_{out}$ Pressure value
p0 Ambient pressure
p1, p2 Pressure value
dm/dt Mass flow dt Sampling time
A Cross-sectional area of 20
$C_D$, Cd_in, Cd_out Nozzle coefficients of 20
R Gas constant
K Isotropic coefficient
T Temperature Ψ, Psi Parameter
m_MAX Maximum value mass
m_EST Estimated value mass
m_SP Setpoint value mass
Δm Difference value
p_max Maximum pressure
p_Offset Minimum pressure
t_max Maximum activation time
η_in, η_out Weighting factor
k_in Correction value (filling)
k_out Correction value (emptying)
SIG_SW Switching signal
SIG_P Measurement signal

The invention claimed is:

1. A method for filling at least one seat cushion of a seat with a fluid, and emptying same of a fluid, comprising:
during a filling or emptying operation, a first pressure value ($p_{in}$) which is determined upstream of a throttle point through which the fluid flows and a second pressure value ($p_{out}$) which is determined downstream of the throttle point are detected as a function of a switched state of an actuating element which is designed for filling or emptying the at least one seat cushion, the actuating element at a location of the throttle point, and
determining an estimated value (m_EST) of a mass of the fluid which is fed to or removed from the at least one seat cushion determined as a function of the first pressure value ($p_{in}$) and the second pressure value ($p_{out}$),
wherein a setpoint value (m_SP) of the mass of the fluid which is to be fed to or removed from the at least one seat cushion is predefined, and the actuating element which is designed for filling or emptying the at least one seat cushion opened as a function of the setpoint value (m_SP) of the mass of the fluid which is to be fed to or removed from the seat cushion and the estimated value (m_EST) of the mass of the fluid which is fed to or removed from the at least one seat cushion.

2. The method as claimed in claim 1, wherein the actuating element and the throttle point are identical or form one structural unit.

3. method as claimed in claim 2, wherein the fluid is gaseous.

4. The method as claimed in claim 2, wherein the fluid is a liquid.

5. The method as claimed in claim 1, wherein the fluid is gaseous.

6. The method as claimed in claim 1, wherein the fluid is a liquid.

7. The method as claimed in claim 1, wherein when the seat cushion is filled, the first pressure value ($p_{in}$) is a value (p1) of a pressure at the fluid outlet of a fluid supply unit, and the second pressure value ($p_{out}$) is a value (p2) of the pressure within the at least one seat cushion.

8. The method as claimed in claim 7, wherein the value (p1) of the pressure at the fluid outlet of the fluid supply unit is determined by a characteristic curve of the fluid supply unit, as a function of an electrical characteristic variable of the fluid supply unit.

9. The method as claimed in claim 1, wherein ultimate emptying or maximum filling of the at least one seat cushion occurs as a function of a maximum pressure value (p_max) or a minimum pressure value (p_Offset) or a threshold value for a time profile of the pressure within the at least one seat cushion or a maximum activation time (t_max) of the actuating element being reached.

10. The method as claimed in claim 1, wherein the seat has at least two seat cushions and a pneumatic or hydraulic valve (80) is arranged pneumatically or hydraulically between two of the seat cushions, wherein the valve is actuated in such a way that at least partial fluid equalization takes place between the two seat cushions.

11. A method for filling at least one seat cushion of a seat with a fluid, and emptying same of a fluid, comprising:
during a filling or emptying operation, a first pressure value ($p_{in}$) which is determined upstream of a throttle point through which the fluid flows and a second pressure value ($p_{out}$) which is determined downstream of the throttle point are detected as a function of a switched state of an actuating element which is designed for filling or emptying the at least one seat cushion, the actuating element at a location of the throttle point, and
determining an estimated value (m_EST) of a mass of the fluid which is fed to or removed from the at least one seat cushion determined as a function of the first pressure value ($p_{in}$) and the second pressure value ($p_{out}$),
wherein the estimated value (m_EST) of a mass of the fluid which is fed to or removed from the at least one seat cushion is determined as a function of a quotient of the second pressure value ($p_{out}$) with respect to the first pressure value ($p_{in}$).

12. A method for filling at least one seat cushion of a seat with a fluid, and emptying same of a fluid, comprising:
during a filling or emptying operation, a first pressure value ($p_{in}$) which is determined upstream of a throttle point through which the fluid flows and a second pressure value ($p_{out}$) which is determined downstream of the throttle point are detected as a function of a switched state of an actuating element which is designed for filling or emptying the at least one seat cushion, the actuating element at a location of the throttle point, and
determining an estimated value (m_EST) of a mass of the fluid which is fed to or removed from the at least one seat cushion determined as a function of the first pressure value ($p_{in}$) and the second pressure value ($p_{out}$),
wherein when the at least one seat cushion is emptied, the first pressure value ($p_{in}$) is a value (p2) of the pressure within the at least one seat cushion, and the second pressure value ($p_{out}$) is a value (p0) of the ambient pressure.

13. A method for filling at least one seat cushion of a seat with a fluid, and emptying same of a fluid, comprising:
during a filling or emptying operation, a first pressure value ($p_{in}$) which is determined upstream of a throttle point through which the fluid flows and a second pressure value ($p_{out}$) which is determined downstream of the throttle point are detected as a function of a switched state of an actuating element which is designed for filling or emptying the at least one seat cushion, the actuating element at a location of the throttle point, and
determining an estimated value (m_EST) of a mass of the fluid which is fed to or removed from the at least one seat cushion determined as a function of the first pressure value ($p_{in}$) and the second pressure value ($p_{out}$),
wherein a maximum value (m_MAX) of the mass of the fluid which is to be fed to or removed from the at least one seat cushion is predefined, and the actuating element which is designed for filling or emptying the at least one seat cushion is opened as a function of the maximum value (m_MAX) of the mass of the fluid which is to be fed to or removed from the at least one seat cushion and the estimated value (m_EST) of the mass of the fluid which is fed to or removed from the at least one seat cushion.

14. The method as claimed in claim 13, wherein parameters which are used to determine the estimated value (m_EST) of the mass of the fluid which is fed to or removed from the at least one seat cushion are adapted as a function of the difference between the estimated value (m_EST) and the maximum value (m_MAX) of the mass of the fluid which is to be fed to or removed from the at least one seat cushion.

15. A device for filling at least one seat cushion with a fluid, and emptying same of a fluid, which device is designed to detect, during a filling or emptying operation, a first pressure value ($p_{in}$) which is determined upstream of a throttle point through which the fluid flows and a second pressure value ($p_{out}$) which is determined downstream of the throttle point as a function of a switched state of an actuating element which is designed for filling or emptying the at least one seat cushion, the actuating element at a location of the throttle point, and to determine an estimated value (m_EST) of a mass of the fluid which is fed to or removed from the at least one seat cushion as a function of the first pressure value ($p_{in}$) and the second pressure value ($p_{out}$), wherein a setpoint value (m_SP) of the mass of the fluid which is to be fed to or removed from the at least one seat cushion is predefined, and the actuating element which is designed for filling or emptying the at least one seat cushion opened as a function of the setpoint value (m_SP) of the mass of the fluid which is to be fed to or removed from the seat cushion and the estimated value (m_EST) of the mass of the fluid which is fed to or removed from the at least one seat cushion.

* * * * *